United States Patent Office 2,747,302
Patented May 29, 1956

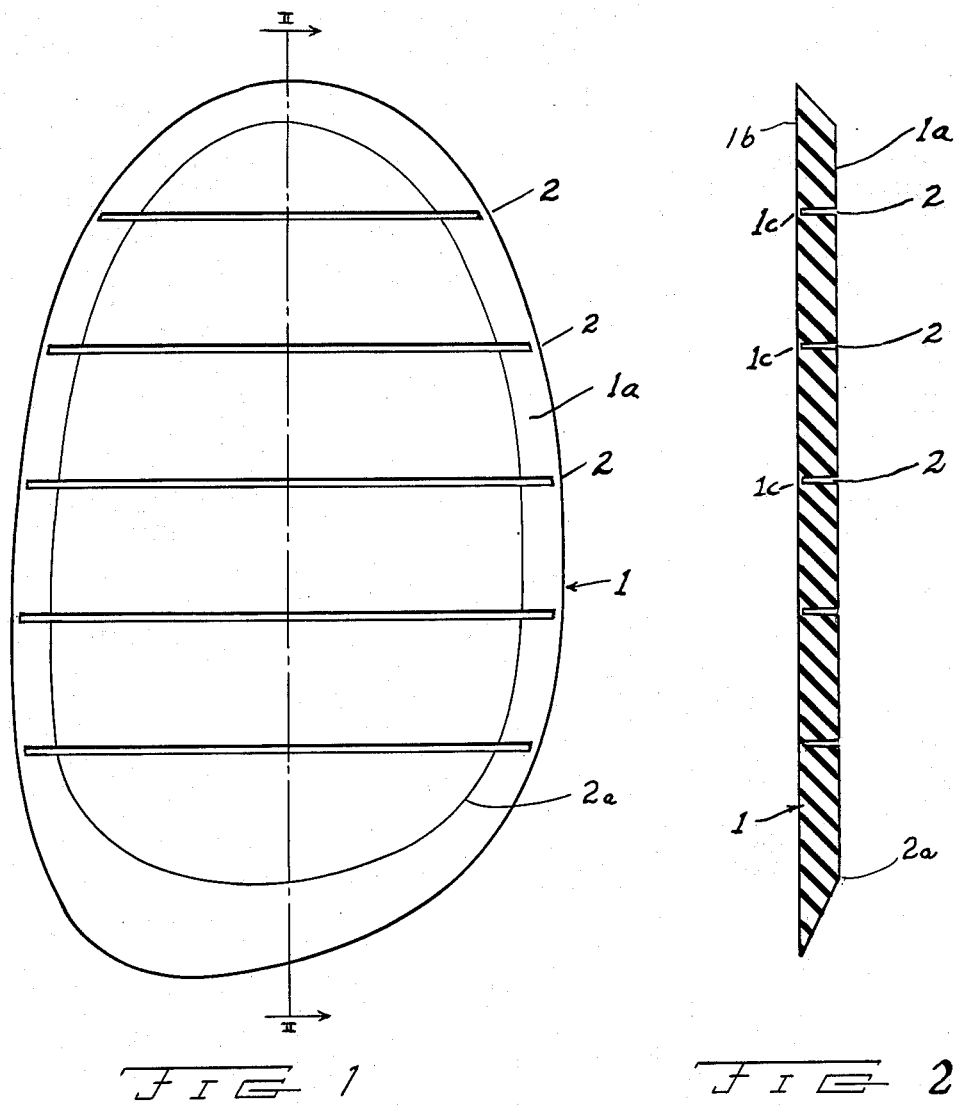

2,747,302
SUPPLEMENTAL RUBBER HALF SOLE

William F. Heisterkamp, Pittsburgh, Pa.

Application February 23, 1955, Serial No. 489,954

1 Claim. (Cl. 36—32)

My invention relates to half soles for shoes and the like and, more particularly, to a rubber half sole or shoe bottom for attachment to the lower surface of a shoe leather sole in order to prolong the life of the leather sole and to provide anti-skid characteristics thereto.

In the past, rubber half soles have been commonly cemented to leather soles of shoes by first roughening the leather sole with a scraper and thereafter adhering the rubber sole thereto by cementing. While it has been possible to obtain initially a strong bond between the rubber half sole and the leather sole, it has been found that after continual flexing during walking, the rubber half sole usually became loosened from the leather sole long before the rubber sole was worn out, particularly at the tip of the toe portion, thereby providing discomfort to the wearer and tending to rapidly loosen adjoining portions. Heretofore it was thought that by forming grooves in the outer surface of the rubber half sole which penetrated a small part of the rubber sole, less than half the depth, that sufficient flexibility would be obtained to partially overcome the above problem. However I found that while some improvement is obtained in this greater flexibility, the problem is not solved because as the rubber half sole is repeatedly bent or flexed during walking, there is still a substantial longitudinal pull or strain provided in the rubber sole as a consequence of such bending, tending to loosen it from the leather sole. After a considerable number of experiments, I made the amazing discovery that it is only by sectionalizing the rubber half sole into substantially separate parts, having negligible bond between adjoining parts, that the above problem is truly solved for the first time.

An object of my invention, accordingly, is to provide a rubber half sole which is devoid of the above named disadvantages of commonly used rubber half soles and which is not only more flexible than previous rubber soles so as to give greater walking comfort, but which avoids any tendency whatsoever of loosening of the rubber sole from continual flexing, even after the rubber soles have been worn throughout most of their thickness.

A further object of my invention is to provide a rubber half sole which will remain bonded to the leather sole throughout substantially the entire life of the rubber half sole.

Other objects and advantages of the present invention will become more apparent from a study of the following description taken with the accompanying drawing wherein:

Figure 1 is a plan view of the outer surface of a rubber half sole embodying the principles of my invention; and Figure 2 is a longitudinal cross-sectional view thereof taken along line II—II of Figure 1.

Referring more particularly to the drawing, numeral 1 denotes a rubber half sole embodying the principles of my invention and formed from a vulcanized rubber compound to provide a sole which is flexible and pliable. The rubber half sole, which may be of the order of $\frac{1}{8}$" or more in thickness, may be grooved at its outer surface 1a in any desired pattern (not shown) to provide an anti-skid surface, as is commonly employed in rubber half soles. The inner roughened surface 1b will have applied thereto a cement of any well-known type for adhering the rubber half sole to the lower roughened surface of the leather sole of a shoe. The rubber half sole is feathered or tapered along its periphery beginning from edge 2a to avoid sharp corners.

In accordance with my invention I subdivide the rubber half sole into 3, 4, 5, 6 or more separate and substantially independent sections by slitting or cutting the rubber sole laterally or by forming parallel grooves 2 which extend to substantially the total depth or thickness of the sole 1. Actually the above mentioned sections could be entirely separate rather than attached as shown, but this would involve some difficulty in packaging the unit for sale, which is usually done by attaching the rubber half sole to a cardboard backing, also which involves difficulty in adhering the various sections in their proper relative position when cementing them to the leather sole. Therefore I have found that instead of making the sections entirely separate, it is preferable to keep them intact by extending grooves 2 just short of the total depth of the rubber half sole, perhaps of the order of about $\frac{1}{64}$" short of the total depth, thereby leaving an extremely thin integral joint portion to hold the respective sections together without impairing the extreme flexibility of the rubber half sole which is obtained by the substantially separate sections. Grooves 2 provide negligible interconnection between the six sections shown (or other number of sections) as the result of bending of the shoe while walking. Therefore there will be no transfer of longitudinal pull or longitudinal strain from one section to another as a consequence of sharp bending of the rubber half sole during walking. Instead, adjoining sections will independently and easily become spread apart, particularly at their outer surfaces, and the extremely thin, paper-like bond therebetween will exert negligible effect, and, in fact, may even become broken without seriously affecting the wearing qualities of the rubber half sole.

Grooves 2 may be formed either by slitting with a razor blade any existing rubber half sole to give it the characteristics afforded by the present invention, or they may be molded during the formation of the rubber half sole. When so molded, the gap or spacing between outer portions of the grooves may be of the order of $\frac{1}{8}$", and the gap or spacing near the bottom of the groove may be of the order of $\frac{1}{32}$", whereas the thickness of the rubber half sole may be of the order of $\frac{1}{8}$", $\frac{3}{16}$" or greater, and the thickness of the interconnecting portions such as 1c, as stated, may be of the order of $\frac{1}{64}$" or less, that is as thin as possible and merely sufficient to hold together the adjoining sections to form an integral unit.

From experience as the result of actual wear of a rubber half sole made according to the principles of my invention, I have found that the sole is not only extremely comfortable since it provides no resistance to flexing of shoes while walking, but it remains firmly bonded to the leather half sole even after being almost completely worn out throughout its full thickness or depth.

Thus it will be seen thaet I have provided a rubber half sole for shoes and the like which provides extreme flexibility and comfort in walking, so as to be useful even for very thinly soled ladies' shoes, and which is formed into substantially separate and independent sections which prevents the transfer of longitudinal pull therebetween, thus avoids any tendency of loosening of the rubber half sole from the leather sole as a consequence of bending movements during walking.

While I have illustrated and described one embodiment of my invention, it will be understood that this is by way of illustration only, and that various changes and modifications may be made within the contemplation of my invention and within the scope of the following claim.

I claim:

A rubber half sole for cementing directly to a leather sole without the necessity of an intermediate layer, said half sole having a plurality of transversely extending parallel grooves extending continuously throughout their length and having open ends and extending throughout most of the depth or thickness of the rubber half sole so as to leave a remaining thickness of rubber between adjoining sections defined by said grooves sufficient only for elastically holding said rubber sole together as an integral unit and constituting the sole means for so holding said sole together so that when said rubber half sole is adhered directly to said leather sole, the said sections will freely move away from each other without transmission of any significant longitudinal pulling forces between said sections as a consequence of bending of the leather sole during walking, whereby the tendency of said rubber sole to become detached from the leather sole during the life of the rubber half sole as a result of said bending will be substantially completely eliminated.

References Cited in the file of this patent

UNITED STATES PATENTS

| 1,680,147 | Gilowitz | Aug. 7, 1928 |
| 1,936,729 | Mebane | Nov. 28, 1933 |

FOREIGN PATENTS

| 867,443 | France | July 28, 1941 |